United States Patent [19]

Cheng et al.

[11] Patent Number: 5,147,836
[45] Date of Patent: Sep. 15, 1992

[54] CATALYTIC CRACKING CATALYSTS

[75] Inventors: Wu-Cheng Cheng, Ellicott City; John A. Rudesill, Columbia, both of Md.

[73] Assignee: W. R. Grace & Co.-Conn., New York, N.Y.

[21] Appl. No.: 780,680

[22] Filed: Oct. 18, 1991

[51] Int. Cl.$^5$ .................. B01J 29/08; B01J 21/12; B01J 21/16
[52] U.S. Cl. ...................... 502/64; 502/68; 502/263
[58] Field of Search ............ 502/64, 68, 235, 263, 502/500

[56] References Cited

U.S. PATENT DOCUMENTS

| | | | |
|---|---|---|---|
| 3,260,680 | 7/1966 | Sanford et al. | 502/263 |
| 3,312,615 | 4/1967 | Cramer et al. | 208/120 |
| 4,010,116 | 3/1977 | Secor et al. | 208/120 |
| 4,154,812 | 5/1979 | Sanchez et al. | 423/626 |
| 4,226,743 | 10/1980 | Seese et al. | 502/263 |
| 4,259,212 | 3/1981 | Gladrow et al. | 502/65 |
| 4,392,988 | 7/1983 | Dobson et al. | 502/263 |
| 4,542,118 | 9/1985 | Nozemack et al. | 502/65 |

FOREIGN PATENT DOCUMENTS 1117511  2/1982  Canada .
0385246  9/1990  European Pat. Off. .
59-1088  1/1984  Japan .

Primary Examiner—Carl F. Dees
Attorney, Agent, or Firm—Arthur P. Savage

[57] ABSTRACT

Catalytic cracking catalysts and catalyst additives which contain silica modified bayerite and/or eta alumina.

13 Claims, 1 Drawing Sheet

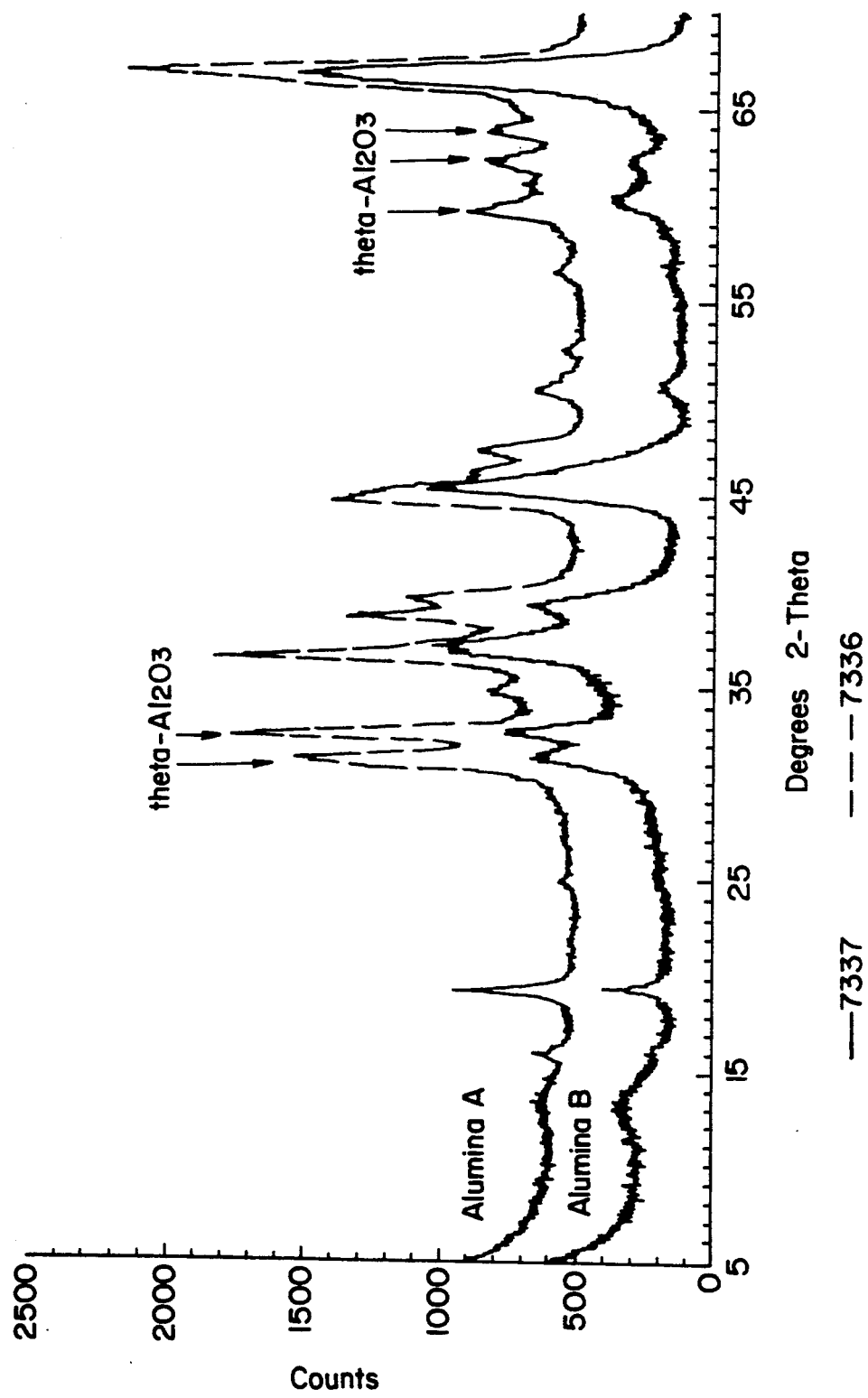

CATALYTIC CRACKING CATALYSTS

The present invention relates to catalytic cracking, and more specifically to catalytic cracking compositions and processes that may be used to catalytically convert high molecular weight feedstocks into valuable lower molecular weight products.

It is generally known that catalytic cracking catalysts which comprise zeolites such as synthetic faujasite zeolite Beta and ZSM-5 dispersed in an inorganic oxide matrix such as silica/alumina hydrogel, sols and clay may be used to economically convert heavy hydrocarbon feedstocks such as gas-oils and/or resid into gasoline and diesel fuel.

More recently it has been disclosed that the addition of aluminas to cracking catalyst compositions will improve the overall performance of the catalyst particularly when used to process feedstocks that contain significant quantities of sulfur and/or contaminant metals such as vanadium and nickel.

Canadian patent 1,117,511 describes FCC catalysts which contain free alumina hydrate, particularly alpha-alumina hydrate (boehmite) which may be used to catalytically crack hydrocarbons that contain sulfur and/or metals including nickel and vanadium.

Japanese Patent Publication 84/1088 discloses catalytic cracking catalysts which contain aluminas such as Bayer Process aluminas (gibbsite), rho, and bayerite that are particularly effective for reducing the production of coke and hydrogen when used to process hydrodesulfurised Kuwait vacuum gas-oil.

U.S. Pat. No. 4,010,116 discloses FCC catalysts which contain pseudo-boehmite aluminas that may contain crystalline trihydrate components such as bayerite and gibbsite.

U.S. Pat. No. 3,312,615 discloses the use of inorganic oxides such as eta alumina in the preparation of FCC catalysts.

EP O 385 246 A1 and copending U.S. application Ser. No. 533,227 filed Jun. 4, 1990, and U.S. application Ser. No. 671,274 filed Mar. 18, 1991 describe zeolite containing catalysts which include bayerite/eta alumina as a matrix component or additive that are particularly useful for the processing of nickel containing feedstocks.

While it is recognized that aluminas including bayerite, eta, pseudoboehmite and gibbsite may be added to catalytic cracking catalysts to improve the stability and coke/dry gas selectivity thereof, the industry continues efforts to develop catalytic cracking catalyst compositions that possess improved hydrothermal stability and which may be used to control the adverse effects of metals such as nickel.

It is therefore an object to provide improved alumina cation FCC catalysts and additives which possess a particularly high degree of hydrothermal stability.

It is another object of the present invention to provide an improved catalytic cracking composition and process for converting hydrocarbon feedstocks to more valuable low molecular weight products such as gasoline and diesel fuel.

It is a further object to provide a catalytic cracking process wherein hydrocarbon feedstocks containing in excess of about 10 ppm nickel may be economically processed in conventional FCC units.

It is a further object to provide improved alumina containing FCC catalyst compositions and additives which can tolerate large quantities of nickel without producing unacceptable quantities of coke and hydrogen.

It is yet a further object to provide a particulate FCC catalyst additive composition that may be blended with conventional zeolite containing catalysts to control the adverse effect of metal such as nickel.

These and additional objects of the invention will become readily apparent to one skilled in the art from the following detailed description, specific examples and drawing wherein the FIGURE is a graphic representation of X-ray diffraction data which illustrates the hydrothermal stability of the silica modified bayerite/eta alumina used in the practice of our invention.

Broadly, our invention contemplates zeolite catalytic cracking catalyst compositions that contain silica modified bayerite and/or eta alumina and the use thereof to process hydrocarbon feedstocks.

More specifically, we have discovered that zeolite containing cracking catalyst compositions which contain from about 2 to 50 wt. % silica modified bayerite and/or eta alumina possess a particularly high degree of hydrothermal stability, metals tolerance and bottoms cracking capability.

In particular, we have found that if silica modified bayerite and/or eta alumina is added to conventional particulate zeolite containing fluid catalytic cracking (FCC) catalysts as either an integral catalyst matrix component or as a separate particulate additive having the same particle size as the conventional FCC catalyst, the catalysts may be used in the catalytic cracking of high molecular weight hydrocarbons feedstocks such as gas-oil, residual oil fractions and mixtures thereof.

The silica modified bayerite and/or eta alumina used in the practice of our invention is obtained by co-precipitating sodium aluminate, sodium silicate and aluminum sulfate at a pH between 10 and 11.5, more preferably between 10.5 and 11, and at a temperature between 120° and 170° F.

The silica modified bayerite and/or eta alumina obtained by the above-noted process contains 0.5 to 10 weight percent $SiO_2$, 80 to 99.5 weight percent bayerite $Al_2O_3$; and the balance various phases of $Al_2O_3$ including boehmite and gibbsite.

Catalysts which may be improved by the addition of silica modified bayerite and/or eta alumina typically contain crystalline alumino-silicate zeolites such as synthetic faujasite i.e. type Y zeolite, type X zeolite, Zeolite Beta, ZSM-5, as well as heat treated (calcined) and/or rare-earth exchange derivatives thereof. Zeolites which are particularly suited include calcined rare-earth exchanged type Y zeolite (CREY), the preparation of which is disclosed in U.S. Pat. No. 3,402,996, ultrastable type Y zeolite (USY) as disclosed in U.S. Pat. No. 3,293,192 as well as various partially exchanged type Y zeolites as disclosed in U.S. Pat. No. 3,607,043 and 3,676,368. The catalysts may also contain molecular sieves such as SAPO and ALPO as disclosed in U.S. Pat. No. 4,764,269. Typical catalyst compositions will include from about 5 to 50 wt. % molecular sieve, about 2 to 40 wt. % silica modified bayerite/eta alumina dispersed in the catalyst particles, and the balance will comprise inorganic oxide binders and additives such as silica, silica alumina and alumina gels and sols as well as clay such as kaolin.

The preparation of silica modified bayerite/eta alumina additives which may be used in the practice of our invention involves combining from about 10 to 90 weight percent silica-modified bayerite, and/or eta alumna and the desired matrix components, such as clay and/or inorganic oxide binders, into an aqueous slurry, and forming the slurry into catalyst particles of desired size. To obtain additive suitable for use in fluid catalytic cracking (FCC) operations, the slurry is spray dried to obtain particles having a size range from about 20 to 140 microns. The silica modified bayerite additive is combined with zeolite containing FCC catalysts in amounts to impart a silica-modified bayerite and/or eta alumina component of about 5 to 50 weight percent in the FCC catalyst/additive mixture. Procedures that may be used in the practice of the invention are disclosed in U.S. Pat. No. 3,957,689, 4,126,579, 4,226,743, 4,458,023 and Canadian patent 967,136.

Using the catalyst preparation procedures set forth in U.S. Pat. No. 3,957,689 and U.S. Pat. No. 4,458,023, catalysts and additives of the present invention are obtained which are attrition resistant and particularly suited for use in commercial FCC operations. Catalysts and additives of the present invention which include the silica/alumina sol binder matrix described in U.S. Pat. No. 3,957,689 or the alumina sol binder described in U.S. Pat. No. 4,458,023 will possess a Davison Attrition Index of 12 or less. The Davison Attrition Index, DI, is determined by the following procedure.

DI Test

A 7 g sample of catalyst is screened to remove particles in the 0 to 20 micron size range. The particles above 20 microns are then subjected to a 5 hour test in the standard Roller Particle Size Analyzer using a 0.07 inch jet and 1 inch I.D. U-Tube as supplied by American Instrument Company, Silver Spring, Md. An air flow of 21 liters per minute is used. The Davison Index is calculated as follows:

$$\text{Davison Index} = \frac{\text{Wt. 0-20 micron material formed during test}}{\text{Wt. original 20 + micron fraction}} \times 100$$

Accordingly, the catalysts and additives of the present invention are characterized by a DI of about 12 or less and preferably below about 10, and more preferably from about 1 to 10 and an average bulk density (ABD) of about 0.6 to 1 g/cm$^3$ and preferably 0.7 to 1 g/cm$^3$ subsequent to heating in air for 2 hours at 1000° F.

The hydrocarbon feedstocks that are used typically contain from about 2 to 10 ppm and as much as 15 ppm nickel. These feedstocks include gas-oils which have a boiling range of from about 340° to 565° C. as well as residual feedstocks and mixtures thereof.

The catalytic cracking process is conducted in conventional FCC units wherein reaction temperatures that range of from about 400° to 700° C. and regeneration temperatures from about 500° to 850° C. are utilized. The catalyst, i.e. inventory, is circulated through the unit in a continuous reaction/regeneration process during which nickel is deposited on the catalyst. The catalyst inventory is maintained at a nickel level of preferably from 300 to 2500 ppm and in some instances as high as 3000 to 8000 ppm by the addition of fresh catalyst and removal of equilibrium catalyst. During use, some of the bayerite may be converted to eta alumina at reaction temperatures employed during the catalytic cracking process. As indicated in the literature bayerite can be converted to eta alumina by heating to temperatures in excess of about 250° C. It is observed that at the equilibrium nickel levels described above the quantity of coke and hydrogen (C+H$_2$) (as measured in a pilot plant) will remain within acceptable levels i.e. from about 3 to 6 wt. % C and from about 0.3 to 0.8 wt. % H$_2$ based on the weight of fresh feed processed.

Having described the basic aspects of the invention the following examples are given to illustrate specific embodiments.

Example 1

A.) Bayerite (Alumina A) was prepared as follows:

Sodium aluminate and aluminum sulfate were prepared according to the methods of U.S. Pat. No. 4,154,812 and kept at 125° F. To 185 gallons of water at 140° F. sodium aluminate was added at a rate of 0.75 gallons per minute. Aluminum sulfate was simultaneously added at a rate to keep the pH constant at 10.75 and precipitate alumina. The precipitation reading was continued for 100 minutes. Afterwards the flow of sodium aluminate was terminated. The pH of the slurry was adjusted to a final value of 9.7 with additional aluminum sulfate. The precipitated alumina was recovered by filtration and washed with tap water at 150° F. and oven dried.

B.) Silica modified bayerite (Alumina B) was prepared as follows:

The same procedure as part A was used with the following exception. A third stream containing sodium silicate, having 10% SiO$_2$ and 3% Na$_2$O was added during the precipitation at a rate of one liter per minute. A total of 112 lbs of the sodium silicate was used to give 4% SiO$_2$ on the final product.

Example 2

The properties of Alumina A and Alumina B are shown in Table I. Upon calcination in air for 2 hours at 1000° F., Alumina B exhibited higher BET surface area and nitrogen pore volume than Alumina A. Upon steaming at atmospheric pressure between 1500° and 1500° F., Alumina B exhibited about 60% greater surface area retention than Alumina A. Furthermore, as shown in FIG. 1, whereas Alumina A undergoes significant transformation to theta-alumina upon steaming for 4 hours at 1600° F., Alumina B still exhibits predominantly eta-alumina with only a minor amount of theta-alumina. Thus the silica-stabilized alumina exhibits both greater surface area and phase stability than the unstabilized alumina.

Example 3

A.) Catalyst A was prepared as follows:

7.3 kg of ultrastable Y zeolite was blended with 2.95 kg of Alumina A and slurried in 29.7 kg of water. The zeolite and alumina slurry was mixed in a high intensity mixer and milled to a fine particle size. 18.6 kg of this slurry was added to 4.9 kg of clay and 26.7 kg of silica sol, prepared according to the teachings of U.S. Pat. No. 3,957,689 and spray dried. The spray dried catalyst was washed with an ammonium sulfate solution to remove the Na$_2$O and exchanged with a rare earth chloride solution to obtain 2.6 to 2.7 weight percent rare earth oxide on Catalyst.

B.) Catalyst B, having the same composition as Catalyst A, with the only exception that a silica modified bayerite having 4 wt. % SiO$_2$ (Alumina B) was substituted in place of bayerite, was prepared. Properties of Catalysts A and B are shown in Table II.

Example 4

Both Catalysts A and B of Example 3 were steamed for 4 hours at 1500° F. in a fluidized bed under atmospheric pressure of steam. After steaming, Catalyst B exhibited a higher matrix area than Catalyst A. The two steamed catalysts were evaluated for their ability to crack a Sour Import Heavy Gas Oil in a microactivity test unit (ASTM D-3907-80). The yield comparison is shown in Table III. The catalyst of the present invention (Catalyst B) yielded lower dry gas ($C_1+C_2$'s), lower LPG ($C_3+C_4$), higher gasoline and higher LCO. The higher yield of LCO, or better bottoms cracking, could be attributed to the higher matrix area of Catalyst B. However, the improved gasoline yield was an unexpected result.

TABLE I

Properties of Bayerite (Alumina A) and Silica-Modified Bayerite (Alumina B)

|  | Alumina A | Alumina B |
|---|---|---|
| Average Particle Size/μ | 28 | 12 |
| Bulk Density/g cm$^{-3}$ | 0.9 | 0.9 |
| TV | 33.6 | 39.0 |
| % SO$_4$ | 0.17 | 0.13 |
| % SiO$_2$ | — | 3.95 |
| BET @ 1000° F./m$^2$g$^{-1}$ | 335 | 381 |
| N2 PV/cm$^3$g$^{-1}$ | 0.29 | 0.42 |
| Steaming Study |  |  |
| BET 4 @ 1500° F. | 99 | 154 |
| BET 8 @ 1500° F. | 91 | 147 |
| BET 4 @ 1600° F. | 79 | 122 |

TABLE II

Properties of Catalysts A and B

|  | Catalyst A | Catalyst B |
|---|---|---|
| Chemical Analysis |  |  |
| Na$^2$O | 0.36 | 0.38 |
| Al$_2$O$_3$ | 33.1 | 33.7 |
| RE$^2$O$^3$ | 2.7 | 2.6 |
| SO$^4$ | 0.42 | 0.49 |
| Physical Properties/2 @ 1000° F. |  |  |
| Davison Index | 6 | 8 |
| Average Bulk Density/cm$^3$g$^{-1}$ | 0.72 | 0.70 |
| Zeolite Area m$^2$g$^{-1}$ | 187 | 197 |
| Matrix Area/m$^2$g$^{-1}$ | 86 | 85 |
| Relative Zeolite Intensity | 96 | 91 |
| Average Particle Size/μ | 67 | 71 |
| 4 @ 1500° F. Steam |  |  |
| Unit Cell Size/Å | 24.29 | 24.29 |
| Relative Zeolite Intensity | 60 | 64 |
| Zeolite Area/m$^2$g$^{-1}$ | 124 | 127 |
| Matrix Area/m$^2$g$^{-1}$ | 38 | 43 |

TABLE III

Yield Comparison of Catalysts A and B

|  | Catalyst A | Catalyst B |
|---|---|---|
| % Conversion | 70 | 70 |
| C/O | 4.28 | 4.15 |
| Yields |  |  |
| H$_2$ | .055 | 0.58 |
| C$_1$ + C$_2$'s | 2.6 | 2.4 |
| C$_3$ olefins | 4.5 | 4.4 |
| Total C$_3$'s | 6.0 | 5.7 |
| C$_4$ olefins | 4.7 | 4.5 |
| iso C$_4$ | 4.2 | 4.1 |
| Total C$_4$'s | 10.0 | 9.7 |
| C$_{5+}$ Gasoline | 47.7 | 48.5 |
| LCO | 19.5 | 19.9 |
| HCO | 10.5 | 10.5 |
| Coke | 3.6 | 3.6 |
| Mass Balance | 99.96 | 99.96 |

What is claimed is:

1. A catalytic cracking catalyst composition which comprises a molecular sieve dispersed in an inorganic oxide matrix and silica modified bayerite and/or eta alumina that contains from about 0.5 to 10 weight percent SiO$_2$.

2. The composition of claim 1 wherein said silica modified bayerite and/or eta alumina is dispersed in the matrix of said catalyst.

3. The composition of claim 1 wherein said silica modified bayerite is included as a separate particulate additive.

4. The composition of claim 1 which contains from about 2 to 40 weight percent of said silica modified bayerite and/or eta alumina.

5. The composition of claim 1 which contains from about 2 to 40 weight percent silica modified bayerite and/or eta alumina, from about 5 to 50 weight percent synthetic faujasite, from about 10 to 60 weight percent clay, and from about 10 to 30 weight percent of an inorganic oxide binder selected from the group consisting of silica, alumina and silica-alumina, hydrogels and sols.

6. The composition of claim 1 wherein the phase purity of said silica modified bayerite and/or eta alumina is above about 75 percent.

7. The composition of claim 5 wherein said binder is silica/alumina sol.

8. The composition of claim 5 wherein said binder is alumina sol.

9. The composition of claim 1 having a particulate size of 20 to 140 μm, and wherein the Davison Attrition Index is less than about 12.

10. The composition of claim 9 wherein the average bulk density of said catalyst is above about 0.6 g/cm$^3$.

11. A catalytic cracking catalyst additive composition which comprises silica modified bayerite and/or eta alumina that contains from about 10 to 90 weight percent SiO$_2$ dispersed in a non-zeolite containing inorganic oxide matrix.

12. The composition of claim 11 having a DI of 1 to 10 and a particle size of 20 to 140 microns.

13. The composition of claim 11 which contains from about 10 to 90 weight percent of said silica modified bayerite and/or eta alumina, and from about 10 to 50 weight percent of an inorganic oxide matrix selected from the group consisting of silica, alumina and silica-alumina, hydrogels and sols and clay.

* * * * *